Mar. 6, 1923.

J. A. KURRUS

RADIATOR HEATER

Filed June 14, 1921

1,447,214

J. A. Kurrus INVENTOR

Patented Mar. 6, 1923.

1,447,214

UNITED STATES PATENT OFFICE.

JOSEPH A. KURRUS, OF EAST ST. LOUIS, ILLINOIS, ASSIGNOR OF ONE-HALF TO JOHN P. BUCHHOLZ, OF EAST ST. LOUIS, ILLINOIS.

RADIATOR HEATER.

Application filed June 14, 1921. Serial No. 477,513.

*To all whom it may concern:*

Be it known that I, JOSEPH A. KURRUS, a citizen of the United States, residing at East St. Louis, in the county of St. Clair and State of Illinois, have invented new and useful Improvements in Radiator Heaters, of which the following is a specification.

This invention relates to heating devices and has for an object the provision of a heater which may be applied to an automobile radiator for the purpose of heating the water to prevent freezing of the cooling system.

Another object of the invention is the provision of an electric heater which is carried and supported by the cap of the radiator and which is capable of being connected to any convenient source of current, such as the battery of the automobile or the lighting system of a building.

With the above and other objects in view, the invention further includes the following novel features and details of construction, to be hereinafter more fully described, illustrated in the accompanying drawings and pointed out in the appended claim.

In the drawings:—

Figure 1:
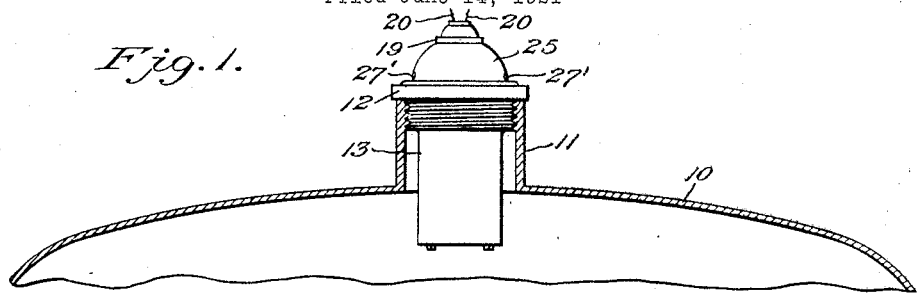
Figure 1 is a fragmentary view showing a portion of an automobile radiator in section with the invention applied thereto, the cap which closes the filling opening and the heater which is carried by the cap, being shown in elevation.
Figure 2:
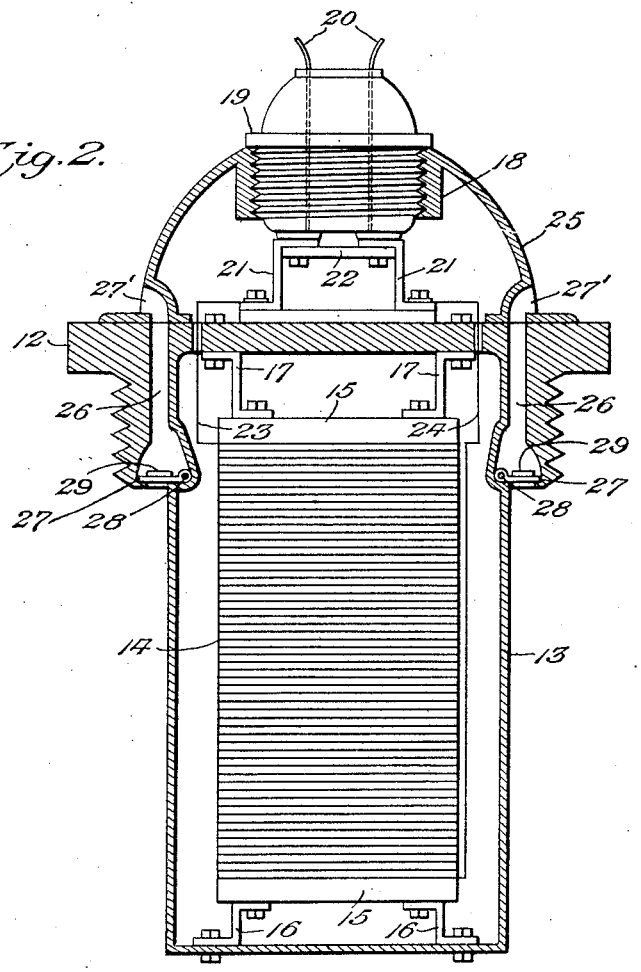
Figure 2 is an enlarged central vertical sectional view taken through the heater and cap.

Referring in detail to the drawings, wherein like characters of reference denote corresponding parts, the reference character 10 indicates a portion of the upper water header of an automobile radiator, from which extends a filling neck 11, the opening of which is closed by a cap 12, all of which may be of the usual construction.

In carrying out the invention, there is secured to the under side of the cap a cylindrical casing 13 of a diameter to be slightly spaced from the walls of the neck 11 when the cap is in position. Located within the casing 13 is a heating coil 14, at each end of which is an insulating member 15. Connecting the insulating members 15 with the casing 13 are arms or braces 16 and 17, the former connecting the bottom of the heating coil with the bottom of the casing while the latter connects the top of the heating coil with the cap 12.

Mounted upon the top of the cap is a socket 18 which is designed to removably receive a plug 19 so that the coil 14 may be supplied with a source of current from a suitable point, as through the conductor wires 20. These wires may lead to the battery of an automobile, or they may be connected with the lighting system of a building or the like. The socket 18 is connected to the top of the radiator cap 12 through the medium of arms 21, a bar 22 serving to connect the outer ends of these arms and provide a conductor to effect an electrical connection with the socket 18. One of the arms 21 is connected by a conductor 23 with one end of the coil 14, while the other arm is connected by means of a conductor 24 with the opposite end of the coil. The top of the cap has secured thereon a shell 25 which encloses the socket 18 and the arms 21 so as to provide the proper finish and afford protection for the parts. If desired, a dummy plug may be used for the purpose of closing the socket 18 when the heater is not in use. This will prevent the entrance of dirt or moisture within the socket.

In order to provide for the escape of steam from the radiator in the event of the water becoming unduly heated, as might occur should the heater be left in operation throughout the night, there is provided escape ports 26. These ports are in the form of tubular members disposed upon opposite sides of the casing 13 and extending from the under side of the cap 12, upward through said cap to outlets 27 provided in the shell 25. The escape ports 26 are normally closed by means of a valve 27 which is pivotally mounted as shown at 28. This valve is held in closed position by means of a counterbalance weight 29 which is so arranged that under pressure of the steam, the valve will be operated to open the escape port 26, but will permit the said port to automatically close when pressure is relieved.

The invention is susceptible of various changes in its form, proportions and minor details of construction and the right is herein reserved to make such changes as properly fall within the scope of the appended claim.

Having described the invention what is claimed is:—

The combination with an automobile radiator having a filling opening and a cap for closing the opening, of a casing carried by the bottom of the cap, an electric heating element in said casing, a housing secured to the top of the cap, a plug socket within the housing, contact members arranged within the housing for engagement by the plug and electric conductors connecting the contact members and heating element.

In testimony whereof I affix my signature.

JOSEPH A. KURRUS.